United States Patent Office 3,288,429
Patented Nov. 29, 1966

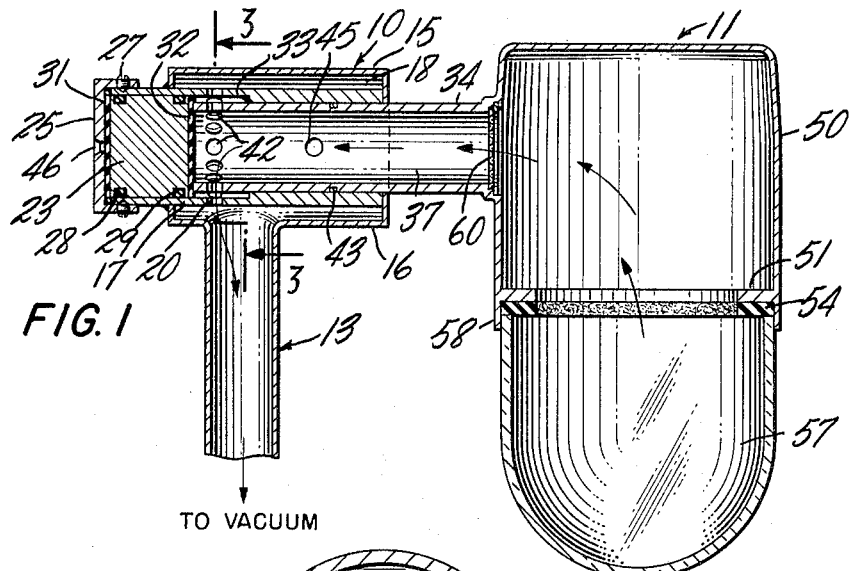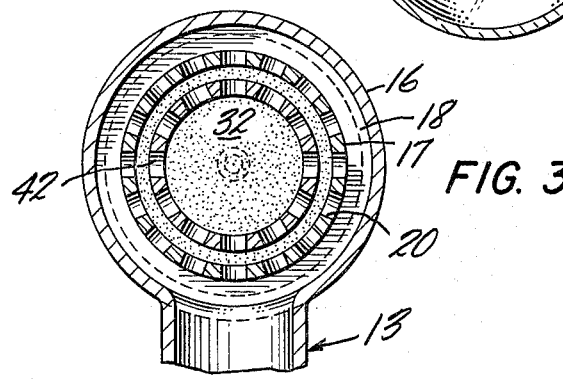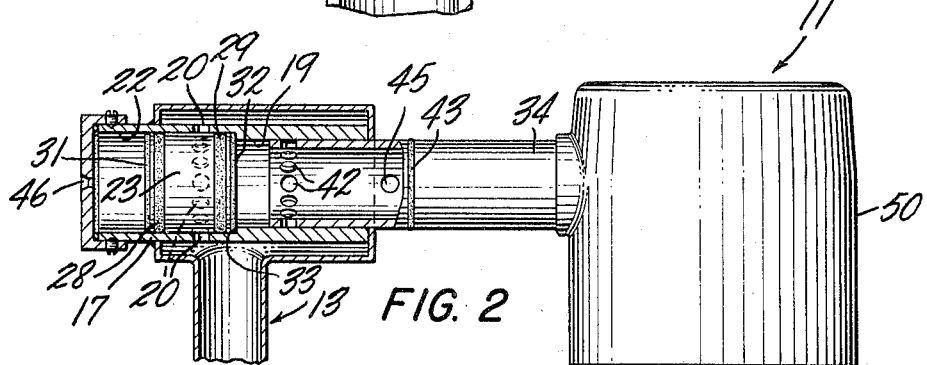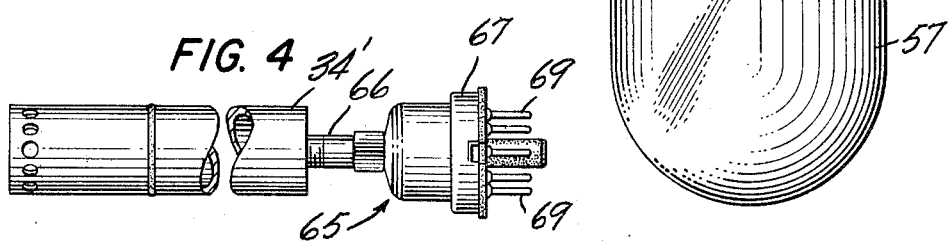

3,288,429
VACUUM CONNECTOR AND ADAPTER
Stefano Termini, 210 Clinton Ave., Brooklyn, N.Y.
Filed Apr. 15, 1964, Ser. No. 359,918
20 Claims. (Cl. 251—149.1)

The present invention relates generally to vacuum processes and more particularly to a vacuum connection for use in such processes.

In vacuum processes, such as freeze drying, a central source of vacuum, for example a freeze dryer, is generally connected to a plurality of connections, for example on a manifold. Connectors in the form of valves are generally provided for releasably connecting vessels, bottles, vacuum tubes, and the like to the individual air intake positions on the manifold. The known valve connectors are mounted, for example, in a nipple or conduit connected to the main vacuum-applying source. The valve connectors are, for example, T-shaped having a cross bore in which the nipple is received and in communication with another bore in which an adapter or tube or instrument and the like is connected. The cross bore, in which the nipple of the manifold is received, is generally a blind bore so that by moving the connector axially relative to the nipple communication is established with the intake conduit or bore and then when the vacuum is to be broken, the connector valve is moved into a position in which the nipple extends axially into the blind bore sufficiently to preclude communication between the nipple and the air intake bore.

The known valve connectors have several deficiencies, however, the cross bore fitting over the nipple generally fits quite snugly over the nipple and it is particularly hard to move the connector valve axially relative to the nipple for establishing communication or to break communication between the air intake conduit or bore and the nipple or conduit to which a vacuum is applied. Moreover, more often than not operators will disconnect the instrumentality, for example a dry-freeze flask, connected to the air intake bore before moving the valve connector to a closed position so that the vacuum is broken or at least impeded. Moreover, at times, the instrumentality is disconnected and the operator will completely forget to move the connector in a direction for closing the air intake so that the vacuum will be completely destroyed and in the event that a manifold connection exists between the improperly operated valve connection and the vacuum source the vacuum may be destroyed on a multiplicity of instrumentalities such as vacuum tubes, freeze drying bottles or flasks and the like.

It is a principal object of the present invention to provide a new and improved vacuum connection for releasably connecting an instrumentality to a conduit under vacuum without breaking or affecting the vacuum.

A feature of the invention is the provision of a combination connector and adapter. The connector comprises means defining a bore in communication with the conduit under vacuum or to be placed under vacuum. A valve comprising a piston or plunger in the connector is automatically operated to a first position closing off communication between the conduit under vacuum and the connector bore. The adapter effects a releasable connection between the connector and the instrumentality to which a vacuum is to be applied from the main vacuum source and comprises a head for releasably receiving a vessel, for example a freeze drying flask, the interior of which is to be placed under vacuum. A tubular projection on the adapter is releasably received in the bore of the connector in a fluid-tight manner and defines a conduit, passageway or flow path in the adapter for establishing communication between the interior of the vessel to which a vacuum is to be applied in operation and the conduit under vacuum when the adapter is connected to the connector. The projection or tubular means defining the conduit on the adapter is provided with an end surface engageable with the valve for actuating it away from its first operative position to a second position in which the conduit under vacuum and the bore in the connector are placed in communication. The tubular projection on the adapter defining the conduit therein which is received in the bore of the connector is provided with an opening for establishing communication between the conduit under vacuum and the conduit defined in the adapter, thereby to place the adapter or, and for example, the interior of a vessel connected to the adapter, under vacuum in operation.

Other features and advantages of the vacuum connection in accordance with the present invention will be better understood as described in the following specification and appended claims, in connection with the following drawings in which:

FIG. 1 is a side elevation view in section of the elements of a vacuum connection according to the invention;

FIG. 2 is a side elevation view of the connection in FIG. 1 partly in section and is illustrative of automatic operation of a valve in a connector according to the invention;

FIG. 3 is a sectional view taken along section lines 3—3 of FIG. 1; and

FIG. 4 is a side longitudinal view of a test device according to the invention.

While the vacuum connection and its component parts according to the invention will be described hereinafter as applied to freeze drying, it will be understood that it is equally applicable to all types of vacuum processes and vacuum systems.

The invention comprises elements for forming a vacuum connection and preferably comprises a connector 10 and an adapter 11 releasably connectable to the connector 10. The connector comprises a conduit 13 connected in operation to a vacuum-applying source, for example, a freeze dryer, not shown. Those skilled in the art will recognize that the conduit 13 can be constructed as a permanent connection to a vacuum manifold, not shown, and can be constructed to be received on a conduit in a permanent or semi-permanent fluid-tight connection therewith or otherwise receive a nipple or some conduit defining means in a fluid-tight connection. It being understood, however, that according to the invention the connector 10 is permanently or semi-permanently connected to the vacuum source and is not in any manner either manually or automatically operated or positioned relative to the manifold part it is mounted on in order to vary the connection between the conduit 13 and the vacuum source.

The connector 10 comprises a T-portion 15 having an outer tubular member 16 internally of which and radially spaced inwardly therefrom is disposed a second coaxial tubular member 17 jointly defining between itself and the outer member 16 an annular chamber 18 in communication with the conduit 13 as shown in FIG. 3. The chamber 18 is placed under vacuum whenever a vacuum is applied to the conduit 13 by the vacuum-applying source, not shown. The tubular member 18 comprises an axially extending portion having a minor diameter defining a bore 19 and is provided with a plurality of openings or holes 20 angularly spaced to provide communication between the bore 19 and the interior of the chamber 18. A second portion of the tubular member 16 defines a cylinder 22 of larger diameter than the bore 19 and in which is disposed a piston 23 reciprocably operable between two operative positions, as hereinafter explained.

A cap 25 is provided for closing the end of the cylinder 22 and is removably mounted on the tubular member 16 with a plurality of set screws 27. The piston 23 is provided with two axially spaced "O" rings 28, 29 and has two oppositely disposed end face surfaces 31, 32 made of a resilient material bonded on the piston or plunger body. The piston is reciprocably operable between the position illustrated in FIG. 1 in which it bears against the inner surface of the cap 25 and to a second position illustrated in FIG. 2 in which it seats on a shoulder 33 formed between the smaller bore 19 and the cylinder portion of the member 16 by the major and minor diameters thereof.

In order to establish a connection between the connector 10 and the adapter 11, which can be made whether a vacuum is being applied to the conduit 13 or not, the adapter 11 is provided with means comprising a projection 34 defining a conduit 37 and is dimensioned to fit axially into the bore 19 with clearance radially as illustrated in the drawing and is of sufficient axial length to extend the complete axial length of the bore 19 a part of the bore forming the cylinder 22 and still extend outwardly of the connector. The conduit-defining means 34 is provided with an edge leading surface 40 for engaging the resilient surface 32 of the piston when inserted into the connector as illustrated in FIG. 2 driving the piston axially to the position illustrated in FIG. 1. The piston 23 in the position illustrated in FIG. 2 closes the holes 20 in the position illustrated in FIG. 1, is moved into a position in which the holes 20 are uncovered and communication is established between the vacuum source and the chamber 18.

The tubular member 34 is provided with a plurality of angularly spaced openings 42 in communication with conduit 37 and the openings 20 so that communication is established between the interior of the conduit 37 and therefore the interior of the adapter 11.

The tubular member 34 is provided with an "O" ring 43 so that a fluid-tight connection is established between the connector 10 and the adapter 11 when the open-end of the tubular member 34 is inserted in the bore 19. A single opening 45 axially spaced from the openings 42 is provided on the tubular member 34 and is in communication with the conduit 37 to allow easy disconnection between the adapter and the connector when the conduit 37 is withdrawn axially from the bore 19. The opening 45 is disposed axially in position to establish communication between the atmosphere and the interior of the conduit 37 after the conduit 37 has been withdrawn sufficiently to allow the piston to be actuated to its position illustrated in FIG. 2 automatically under the control of atmospheric pressure actuating the piston to this position through an opening 46 in the cap 45.

While the adapter 11 may be constructed in any suitable manner depending upon the intended purpose, a preferred construction of the adapter is illustrated in the drawing for use in freeze drying. The adapter comprises a tubular portion or cup-shaped head 50 open at one end. An annular stop 51 is disposed axially spaced inwardly from the opening or mouth of the head on which is mounted an annular gasket 54. A flask or vessel 57 made of glassware, plastic or metal or any other suitable material, is received in the adapter 11 as illustrated for freeze drying contents of the flask. The flask extends axially inwardly into the tubular portion 50 so that a skirt 58 holds the flask in radial position and the stop 51 holds it in axial position so that it is not drawn into the adapter.

The adapter may be provided with a suitable filter, for example across the open mouth of the portion or head 50 or as illustrated in the drawing, a filter 60 is provided at the juncture between the conduit 37 and the interior of the tubular portion 50.

Those skilled in the art will understand that a type construction adapter as illustrated in the drawing permits the construction of flasks with an optimum mouth or opening which is the same as that of the adapter and therefore is a maximum opening for optimizing the vacuum applied to the contents in the flask 57. Moreover, the invention provides a connection in which a single adapter provides connection between the flask and the vacuum source without an intermediate member as required heretofore.

The invention provides for easily testing the vacuum being applied. A test device 65 is illustrated in FIG. 4 in which conduit means 34', comparable to the tubular projection 34, is provided and connected through a tubular connection 66 to a standard vacuum gauge tube 67 provided with known pin connnections 69 for testing the vacuum by insertion of conduit means 34' into the connector 10 in the manner in which the means 34 and the conduit 37 is inserted therein.

Those skilled in the art will understand that the adapter can be connected to the connector in any relative angular position of the tubular member 34 relative to the bore it is inserted in and the various openings therein need not be in registry in view of the clearance between the outer surface of conduit means 34 and the cylinder portion 22. Moreover, it is to be understood the piston 23 and conduit means 34 and 34' cooperate with the other components of the connection in a fluid-tight or vacuum-tight manner and that the various O rings assisting to maintain the connection vacuum-tight may be replaced by suitable gasket means or suitable rings. Furthermore the various round openings 20, 42, 45 may be made as slots or rectangular or square openings.

While a preferred embodiment of the invention has been shown and described, it will be understood that many modifications and changes can be made within the true spirit and scope of the invention.

What I claim and desire to secure by Letters Patent is:

1. A vacuum connection for releasably connecting and disconnecting an instrumentality to a conduit under vacuum without breaking the vacuum comprising, in combination, a valve connector comprising means connected to said conduit in operation defining a bore in communication with said conduit, a valve reciprocable in said bore automatically biased toward an operative first position closing off communication between said conduit and said bore, an adapter comprising means for releasably receiving an instrumentality to which a vacuum is to be applied, means on said adapter inserted into said connector bore in operation and releasably received in said bore in a fluid-tight manner defining a conduit in said adapter in communication with said instrumentality in operation, said means defining said conduit on said adapter having a surface engaged with said valve when inserted in said bore for actuating said valve away from said first position to a second position in which the first mentioned conduit and said bore are in communication, and said means on said adapter received in said bore having an opening providing communication between said bore and said conduit on said adapter thereby to provide communication between said conduit on said adapter and the first-mentioned conduit.

2. A vacuum connection for releasably connecting and disconnecting an instrumentality to a conduit under vacuum without breaking the vacuum comprising, in combination, a valve connector comprising means connected to said conduit in operation defining a bore in communication with said conduit, a piston reciprocable in said bore automatically biased under control of atmosperic pressure toward an operative first position closing off communication between said conduit and said bore, an adapter comprising means for releasably receiving an instrumentality to which a vacuum is to be applied, means on said adapter inserted into said connector bore in operation and releasably received in said bore in a fluid-tight manner defining a conduit in said adapter in communication with said instrumentality in operation, said means defining said conduit on said adapter having a surface engaged with said piston when inserted in said bore for actuating said piston away from said first position to a second position in which the first mentioned conduit and said bore are in communication, and said means on said adapter received in said bore having an opening providing communication between said bore and said conduit on said adapter thereby to provide communication between said conduit on said adapter and the first mentioned conduit.

3. A vacuum connection for releasably connecting and disconnecting an instrumentality to a conduit under vacuum without breaking the vacuum comprising, in combination, a valve connector comprising means connected to said conduit in operation defining a bore in communication with said conduit, a valve in said valve connector automatically biased toward an operative first position closing off communication between said conduit and said bore, an adapter comprising means for releasably receiving an instrumentality to which a vacuum is to be applied, means on said adapter inserted into said connector bore in operation and releasably received in said bore in a fluid-tight manner defining a conduit in said adapter in communication with said instrumentality in operation, said means defining said conduit on said adapter having a surface engaged with said valve when inserted in said bore for actuating said valve away from said first position to a second position in which the first mentioned conduit and said bore are in communication, said means on said adapter received in said bore having an opening providing communication between said bore and said conduit on said adapter thereby to provide communication between said conduit on said adapter and the first-mentioned conduit, and said means defining said conduit on said adapter having another opening providing communication between said conduit on said adapter and the atmosphere when said means defining said conduit on said adapter is withdrawn a given extent from said bore and disposed to be out of communication with said atmosphere at least when said valve is engaged by said surface.

4. A vacuum connection for releasably connecting and disconnecting an instrumentality to a conduit under vacuum without breaking the vacuum comprising, in combination, a valve connector comprising means connected to said conduit in operation defining a bore in communication with said conduit, a piston reciprocable in said connector automatically biased under control of atmospheric pressure toward an operative first position closing off communication between said conduit and said bore, an adapter comprising means for releasably receiving an instrumentality to which a vacuum is to be applied, means on said adapter inserted into said connector bore in operation and releasably received in said bore in a fluid-tight manner defining a conduit in said adapter in communication with said instrumentality in operation, said means defining said conduit on said adapter having a surface engaged with said piston when inserted in said bore for actuating said piston away from said first position to a second position in which the first mentioned conduit and said bore are in communication, said means on said adapter received in said bore having an opening providing communication between said bore and said conduit on said adapter thereby to provide communication between said conduit on said adapter and the first-mentioned conduit, said means defining said conduit on said adapter having another opening providing communication between said conduit on said adapter and the atmosphere when said means defining said conduit on said adapter is withdrawn a given extent from said bore and disposed to be out of communication with said atmosphere at least when said piston is engaged by said surface.

5. A vacuum connection for releasably connecting and disconnecting a freeze drying flask to a conduit of a freeze dryer under vacuum without breaking the vacuum comprising, in combination, a valve connector comprising means connected to said conduit in operation defining a bore in communication with said conduit, a valve reciprocable in said bore automatically biased toward an operative first position closing off communication between said conduit and said bore, an adapter comprising means for releasably receiving a freeze drying flask to which a vacuum is to be applied, means on said adapter inserted into said connector bore in operation and releasably received in said bore in a fluid-tight manner defining a conduit in said adapter in communication with the interior of said flask in operation, said means defining said conduit on said adapter having a surface engaged with said valve when inserted in said bore for actuating said valve away from said first position to a second position in which the first mentioned conduit and said bore are in communication, and said means on said adapter received in said bore having an opening providing communication between said bore and said conduit on said adapter thereby to provide communication between said conduit on said adapter and the first-mentioned conduit.

6. A vacuum connection for releasably connecting and disconnecting a freeze drying flask to a conduit of a freeze dryer under vacuum without breaking the vacuum comprising, in combination, a valve connector comprising means connected to said conduit in operation defining a bore in communication with said conduit, a valve reciprocable in said valve connector bore automatically biased toward an operative first position closing off communication between said conduit and said bore, an adapter comprising means for releasably receiving a freeze drying flask to which a vacuum is to be applied, means on said adapter inserted into said connector bore in operation and releasably received in said bore in a fluid-tight manner defining a conduit in said adapter in communication with the interior of said flask in operation, said means defining said conduit on said adapter having a surface engaged with said valve when inserted in said bore for actuating said valve away from said first position to a second position in which the first mentioned conduit and said bore are in communication, said means on said adapter received in said bore having an opening providing communication between said bore and said conduit on said adapter thereby to provide communication between said conduit on said adapter and the first-mentioned conduit, and said means defining said conduit on said adapter having another opening axially spaced from said first opening providing communication between said conduit on said adapter and the atmosphere when said means defining said conduit on said adapter is withdrawn a given extent from said bore and disposed to be internally of said bore in said connector and out of communication with said atmosphere at least when said valve is engaged by said surface.

7. A vacuum connection for releasably connecting and disconnecting a freeze drying flask to a conduit of a freeze dryer under vacuum without breaking the vacuum comprising, in combination, a valve connector comprising means connected to said conduit in operation defining a bore in communication with said conduit, a piston reciprocable in said valve connector bore automatically biased under control of atmospheric pressure toward an operative first position closing off communication between said conduit and said bore, an adapter comprising means for releasably receiving a freeze drying flask to which a vacuum is to be applied, means on said adapter inserted into said connector bore in operation and releasably received in said bore in a fluid-tight manner defining a conduit in said adapter in communication with the interior of said flask in operation, said means defining said conduit on said adapter having a surface engaged with said piston when inserted in said bore for actuating said piston away from said first position to a second position in which the first mentioned conduit and said bore are in communication, and said means on said adapter received in said bore having an opening providing communication between said bore and said conduit on said adapter thereby to provide communication between said conduit on said adapter and the first-mentioned conduit.

8. A vacuum connection for releasably connecting and disconnecting a freeze drying flask to a conduit of a freeze dryer under vacuum without breaking the vacuum comprising, in combination, a valve connector comprising means connected to said conduit in operation defining a bore in communication with said conduit, a piston reciprocable in said valve connector bore automatically biased under control of atmospheric pressure toward an operative first position closing off communication between said conduit and said bore, an adapter comprising means for releasably receiving a freeze drying flask to which a vacuum is to be applied, means on said adapter inserted into said connector bore in operation and releasably received in said bore in a fluid-tight manner defining a conduit in said adapter in communication with the interior of said flask in operation, said means defining said conduit on said adapter having a surface engaged with said piston when inserted in said bore for actuating said piston away from said first position to a second position in which the first mentioned conduit and said bore are in communication, said means on said adapter received in said bore having an opening providing communication between said bore and said conduit on said adapter thereby to provide communication between said conduit on said adapter and the first-mentioned conduit, and said means defining said conduit on said adapter having another opening axially spaced from said first opening providing communication between said conduit on said adapter and the atmosphere when said means defining said conduit on said adapter is withdrawn a given extent from said bore and disposed to be internally of said bore in said connector and out of communication with said atmosphere at least when said piston is engaged by said surface.

9. A vacuum connection for releasably connecting and disconnecting a freeze drying flask to a conduit of a freeze dryer under vacuum without breaking the vaccum comprising, in combination, a valve connector comprising means connected to said conduit in operation defining a bore having a major and a minor diameter and in communication with said conduit, means defining a shoulder in said bore, a piston reciprocable in said valve connector bore automatically biased under control of atmospheric pressure toward an operative first position against said shoulder for closing off communication between said conduit and said bore, an adapter comprising cup-shaped means for releasably receiving a freeze drying flask and in communication with the interior of said flask to which a vacuum is to be applied, means on said adapter extending outwardly from said cup-shaped means inserted into said connector bore in operation and releasably received in said bore in a fluid-tight manner defining a conduit in said adapter in communication with said flask in operation, said means defining said conduit on said adapter having a surface engaged with said piston when inserted in said bore for actuating said piston valve away from said first position to a second position axially spaced from said first position for placing the first mentioned conduit and said bore in communication, and said means on said adapter received in said bore having an opening providing communication between said bore and said conduit on said adapter thereby to provide communication between said conduit on said adapter and the first-mentioned conduit.

10. For use in releasably connecting and disconnecting a freeze drying flask to a conduit of a freeze dryer under vacuum without breaking the vacuum comprising, in combination, a valve connector comprising means connected in operation to said conduit defining a bore in communication with said conduit and open at one end, a piston valve reciprocable in said valve connector bore automatically constantaly biased toward an operative first position closing off communication between said conduit and said bore, an adapter comprising means for releasably receiving a freeze drying flask to which a vacuum is to be applied, means on said adapter inserted into said connector bore in operation and releasably received in said bore in a fluid-tight manner defining a conduit in said adapter in communication with the interior of said flask in operation, said means defining said conduit on said adapter having a surface engaged with said piston valve when inserted in said bore for actuating said piston valve away from said first position to a second position in which the first mentioned conduit and said bore are in communication, and said means on said adapter received in said bore having an opening providing communication between said bore and said conduit on said adapter thereby to provide communication between said conduit on said adapter and the first-mentioned conduit, whereby when said adapter is disconnected from said connector said piston valve automatically cuts off communication between said bore and the first mentioned conduit.

11. The combination according to claim 10 in which said means defining said bore comprises means defining a shoulder in said bore for limiting the axial travel of said piston and defining said first position thereof.

12. The combination according to claim 11, in which said piston comprises oppositely disposed resilient face surfaces.

13. The combination according to claim 10, in which said means defining said bore comprises means for automatically biasing said piston valve to said first position under control of atmospheric pressure.

14. The combination according to claim 10, in which said means on said adapter for releasably receiving said flask comprises a cup-shaped head having a mouth for releasably receiving the mouth of said flask to place said cup-shaped head in communication with the interior of said flask.

15. The combination according to claim 14, including a flask having a mouth substantially as large as the mouth of said cup-shaped head.

16. The combination according to claim 14, in which said cup-shaped head comprises an internal stop to limit the axial movement of said flask in a direction toward the interior of said cup-shaped head.

17. The combination according to claim 10, in which said means defining said conduit in said adapter comprises a tubular projection insertable axially into said bore in said connector through said open end and withdrawable therefrom axially.

18. The combination according to claim 17, in which said tubular projection is open at one end and said conduit in said adapter is in communication with said open end.

19. The combination according to claim 17, in which said tubular projection comprises at least one opening in communication with said conduit in said adapter and said means defining said bore comprises means to place said opening and the first mentioned conduit in communication when said piston valve is moved away from said first position regardless of the relative angular position between said tubular projection and said bore in said connector.

20. The combination according to claim 10, including a test device comprising a tubular element corresponding to said means on said adapter defining said conduit in said adapter received in said bore in lieu of said adapter, and means on said test device for sensing the vacuum level applied to the first mentioned conduit.

References Cited by the Examiner
UNITED STATES PATENTS

| | | | |
|---|---|---|---|
| 2,451,456 | 10/1948 | Rawson | 251—149.1 |
| 2,725,245 | 11/1955 | Hein | 251—149.1 |
| 3,165,386 | 1/1965 | Kapeker | 251—147 |

M. CARY NELSON, *Primary Examiner.*

W. R. CLINE, *Assistant Examiner.*